United States Patent [19]

Kishline

[11] 4,271,922
[45] Jun. 9, 1981

[54] WHEEL SUSPENSION SYSTEM
[75] Inventor: Alan R. Kishline, Janesville, Wis.
[73] Assignee: Dana Corporation, Toledo, Ohio
[21] Appl. No.: 966,077
[22] Filed: Dec. 4, 1978
[51] Int. Cl.³ .................. B60K 17/30; B60G 3/08
[52] U.S. Cl. ............................ 180/254; 180/73 C; 180/256; 280/666
[58] Field of Search ............... 180/254, 253, 255, 256, 180/257, 258, 259, 260, 261, 262, 263, 73 C, 73 D, 73 R; 280/666, 701

[56] References Cited
U.S. PATENT DOCUMENTS

| 2,611,625 | 7/1952 | Kishline et al. | 280/666 |
| 3,155,186 | 11/1964 | Cadmus et al. | 180/73 C |
| 3,162,262 | 12/1964 | Ordorica et al. | 180/256 |
| 3,630,303 | 12/1971 | Froumajou | 180/256 |
| 3,642,084 | 2/1972 | Takahashi | 280/667 |
| 3,806,151 | 4/1974 | Prasniewski | 280/701 |
| 3,948,337 | 4/1976 | Richardson et al. | 180/256 |
| 4,057,120 | 11/1977 | Roethlisberger | 180/263 |

Primary Examiner—John J. Love
Assistant Examiner—Donn McGiehan
Attorney, Agent, or Firm—Wilson, Fraser, Barker & Clemens

[57] ABSTRACT

An independent suspension system in which a steering knuckle is employed with an upper ball joint connection to an upper control arm and a lower ball joint connection to an axle outer end.

7 Claims, 6 Drawing Figures

WHEEL SUSPENSION SYSTEM

BACKGROUND OF THE INVENTION

The illustrated and described invention relates generally to a design for an independent wheel suspension system for the front drive wheels of a vehicle which may be preassembled and easily installed to a frame type or unitized type vehicle.

The suspension system of the invention contains minimal components, and is of a design which enables the components to be fabricated from light-weight materials. The resultant vehicle is thereby lightened from an overall standpoint permitting the utilization of smaller, lighter-weight, and therefore, more economical engines from the standpoint of fuel consumption.

SUMMARY OF THE INVENTION

It is an object of the invention to produce an independent suspension system for the front drive wheels of a vehicle which may be preassembled and installed under the vehicle frame from the bottom thereof.

Another object of the invention is to produce an independent suspension system for the front drive wheels of a vehicle having components of composite stamped design to result in a reduction in overall weight.

Another object of the invention is to produce an independent suspension system for the front wheels of a vehicle wherein the carrier housing is attached to one of the associated swing axle arms thereby avoiding the imposition of any wheel loads on the differential housing.

Still another object of the invention is to produce an independent suspension system capable of utilizing variable velocity universal steering joints thereby reducing the cost of a suspension system which might otherwise require constant velocity steering joints.

The above, as well as other objects of the invention may be achieved by an independent wheel suspension system comprising a frame; an elongate cross member secured to the frame; a pair of upper control arms pivotally secured to the cross member and extending in opposite directions outwardly therefrom; a pair of axle arms pivotally secured to the cross member and extending in opposite directions therefrom below the control arm; a pair of vertically extending wheel carrying steering knuckles; a first set of ball joint connection means interconnecting the outer end of the control arms to the upper ends of respective ones of the steering knuckles; and a second set of ball joint connection means interconnecting the outer end of the axle arms to the lower end of respective ones of the steering knuckles.

BRIEF DESCRIPTION OF THE DRAWINGS

The above, as well as other objects and advantages of the invention, will become readily apparent to those skilled in the art from reading the following detailed description of an embodiment of the invention when considered in the light of the accompanying drawings, in which.

DETAILED DESCRIPTION OF PREFERRED EMBODIMENT OF THE INVENTION

Figure 1:
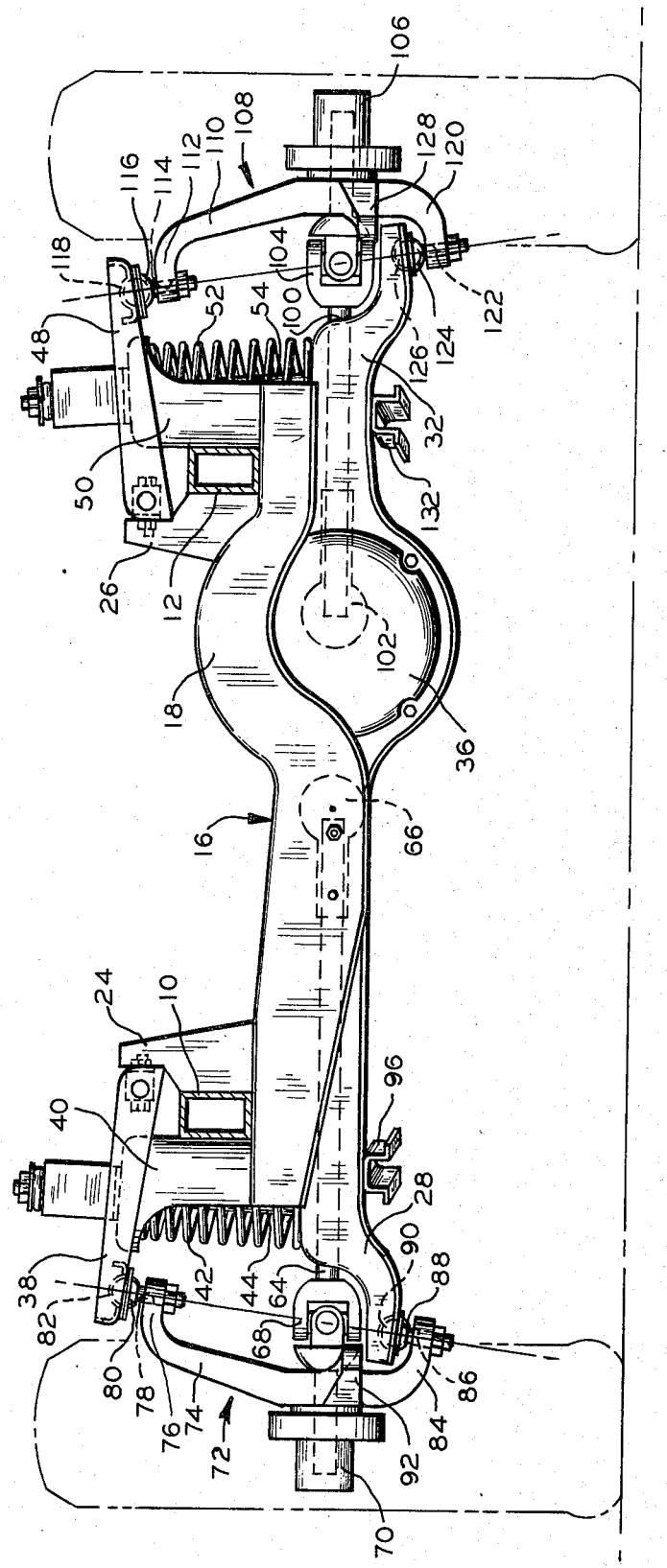
FIG. 1 is a front elevational view of an independent wheel suspension system for a vehicle incorporating the salient features of the invention.

Referring to the drawings, the invention illustrated is typically utilized as an independent suspension system for a vehicle wherein driving torque is applied to the associated front wheels. Accordingly, the illustrated embodiment and the following description will be limited to an independent suspension system for front driving wheels of a vehicle. More specifically, there is illustrated a pair of spaced apart chassis frame members 10 and 12 which are designed to extend longitudinally of the associated vehicle. A front frame cross member 14 has its opposite end portions welded or otherwise suitably secured to respective ones of the frame members 10 and 12. A similar rear frame cross member (not shown) is usually employed to form a complete integral frame.

A cross member 16 is disposed aft of the frame cross member 14, and is suitably secured to the frame members 10 and 12 as by welding or by threaded fasteners. The cross member 16 includes and upper generally planar web portion 18 and downwardly side portions 20 and 22.

Inboard of each of the frame members 10 and 12 and affixed to the web portion 18 of the cross member 16 are upwardly extending stanchions 24 and 26.

A swing axle arm 28 has its innermost end pivotally mounted by a bracket 30 to the downwardly extending longitudinal side portion 20 of the cross member 16. The outermost end of the axle arm 28 extends beyond the cross member 16 and the frame member 10.

Another swing axle arm 32 has its innermost end pivotally mounted by a bracket 34 to the downwardly extending longitudinal side portion 22 of the cross member 16. In a manner similar to the axle arm 28, the outermost end of the axle arm 32 extends beyond the cross member 16 and the frame member 12. It will be observed that the axle arm 32 is formed integral with the housing of a differential 36.

It will be noted that the center line of the bracket mountings 30 and 34 are in substantial alignment with one another mandating that the respective axle arms 28 and 32 swing about aligned pivot points. In the illustrated embodiment of the invention, the bracket mountings 30 and 34 are disposed on the right hand side of the vehicle center line opposite the axle carrier housing 36, as is clearly shown in FIG. 2. The carrier housing 36 is situated on the left-hand side of the vehicle center line. It will be understood that relative position of the parts would be reversed in the event the carrier housing 36 were situated on the right hand side of the vehicle center line. It will be understood that the purpose of the above arrangement of having the axle arm pivot points off-set from the vehicle center line is to insure equal right and left suspension geometry. The suspension geometry can best be understood by visualizing a plane on the left-hand side of the vehicle center line which is determined by the following three points: a pivot axis at the mounting bracket 34, the ball-like member 124, and the mounting bracket 134 for the radius arm 132. Basically, the aforedetermined plane will rotate or swing about an axis which extends between the mounting bracket 34 and the mounting bracket 134. During actual operation of a vehicle containing the present suspension system, the wheel associated with the wheel hub 106 and the steering knuckle 108 will swing about an axis which extends between the mounting bracket 34 and the mounting bracket 134. This system is also further designed to cause the aforementioned axis to intersect the center of the universal coupling 66.

The right hand suspension geometry is determined in the same manner as the left-hand geometry by utilizing the corresponding elements on the right hand side of the center line of the vehicle; namely, the pivot axis of the mounting bracket 30, the mounting bracket for the rear of the radius arm 96, and the ball-like member 88. The resultant plane will swing about an axis which extends between the mounting bracket 30 and the mounting bracket for the end of the radius arm 96. This axis intersects the center of the universal coupling 66 at the same point as the corresponding left-hand axis. It will be understood that the intersection of these axes falls on the center line of the vehicle.

An upper control arm 38 has the innermost end thereof pivotally mounted to the upper end of the stanchion 24. The upper control arm 38 is bifurcated to permit pivotal movement thereof to occur without any interference with an upstanding hollow spring and shock absorbing tower 40 which is affixed to and integral with the one end of the cross member 16. The upstanding tower 40 is effective to contain the upper ends of a helical spring member 42 and an associated coaxially arranged shock absorber 44. The lower ends of the spring member 42 and the shock absorber 44 are affixed to the axle arm 28 proximate to but slightly inwardly of the outermost end thereof.

Another upper control arm 48 has the innermost end thereof pivotally mounted on the upper end of the stanchion 26. The upper control arm 48 is bifurcated to permit pivotal movement thereof to occur without any interference with an upstanding hollow spring and shock absorber tower 50 which is affixed to and integral with the opposite end of the cross member 16. The upstanding tower 50 is effective to contain the upper ends of a helical spring 50 and an associated coaxially disposed shock absorber 54. The lower ends of the spring member 52 and shock absorber 54 are affixed to the axle arm 32 proximate to, but slightly inwardly of the outermost end thereof.

A drive axle 64 has its innermost end drivingly interconnected with the differential 36 by a splined drive coupling 66 which will transmit rotational torque to the axle 64 permitting the same to slide, rotate, and pivot relative to the differential 36. The outermost end of the drive axle 64 is connected to a universal coupling 68 which, in turn, is connected to a vehicle wheel hub 70. The wheel hub 70 is journaled within a bushing in a steering knuckle 72. The steering knuckle 72 is formed to include a generally vertically extending main body portion 74 having an upper end 76 which terminates in a substantially transverse inwardly extending portion containing an aperture 78 for receiving a threaded shaft portion of a ball-like member 80 of a conventional ball-joint connection, the socket portion 82 of which is typically press fitted to the outermost end of the upper control arm 38. The lower end 84 of the main body portion 74 of the steering knuckle 72 terminates in an inwardly extending portion containing an aperture 86 for receiving a tapered stud portion of a ball-like member 88 of a conventional ball joint connection, the socket portion 90 of which is typically press fitted to the undersurface of the outermost end of the axle arm 28.

Figure 2:
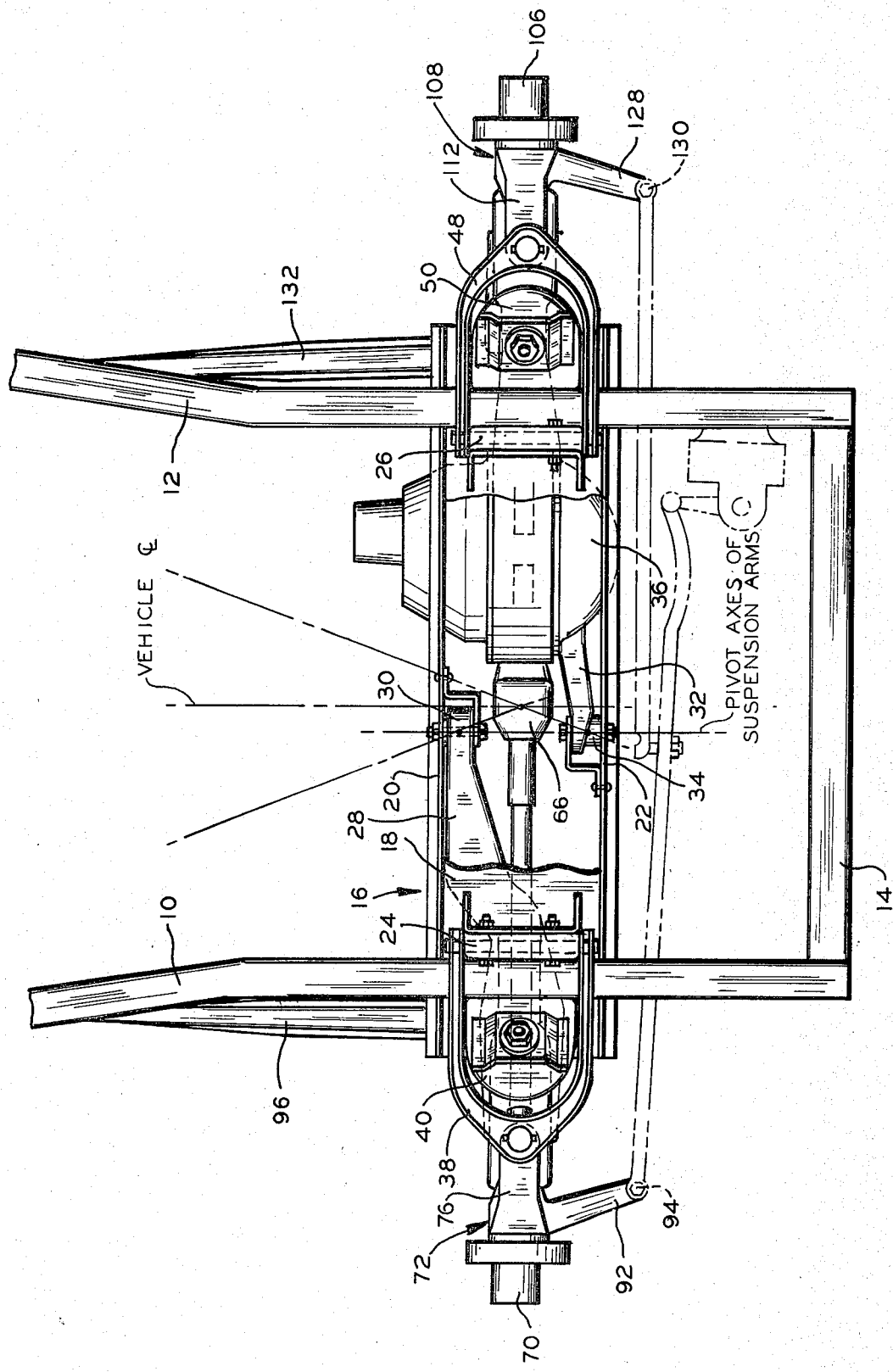
FIG. 2 is a plan view of the system illustrated in FIG. 1 with portions cut away to more clearly illustrate the invention.
Figure 3:
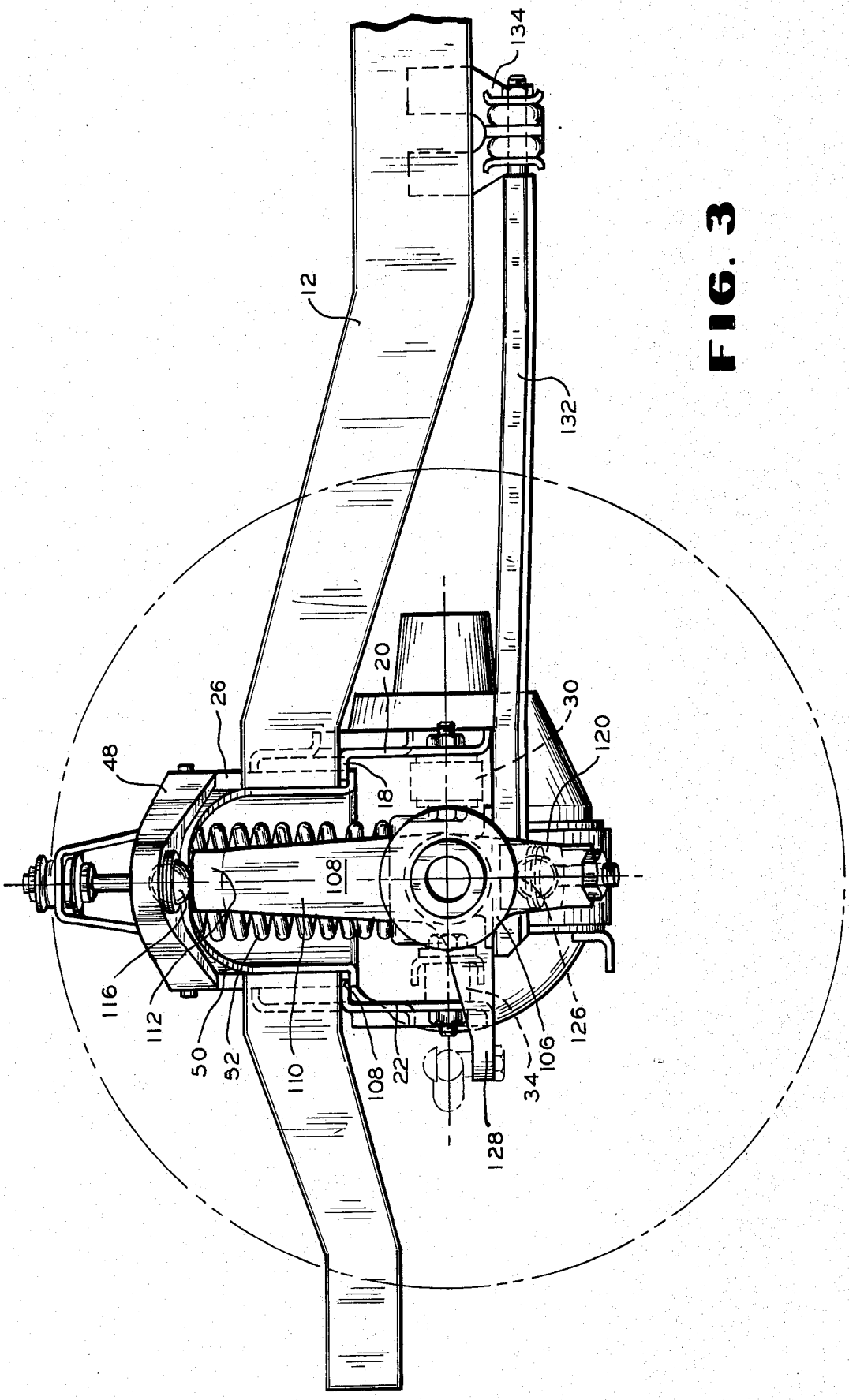
FIG. 3 is an enlarged side elevational view of the system illustrated in FIGS. 1 and 2.

The steering knuckle 72 includes a steering arm 92 which extends forwardly from the main body portion 74 and contains an aperture 94 for pivotal interconnection with steering linkage illustrated generally in phantom lines in FIG. 2.

A radius arm 96 is typically employed by having its forward end coupled to the undersurface of the axle arm 28 and the rear end coupled to the side frame member 10 by means of an adjustable mounting bracket including rubber bushing members (not shown).

Figure 4:
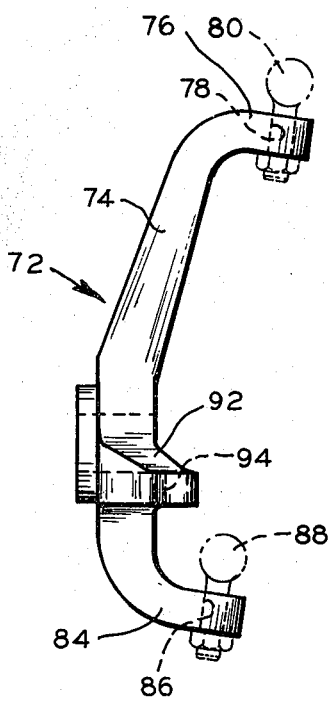
FIG. 4 is an enlarged front view of one of the steering knuckles of the system illustrated in FIGS. 1, 2, and 3.
Figure 5:
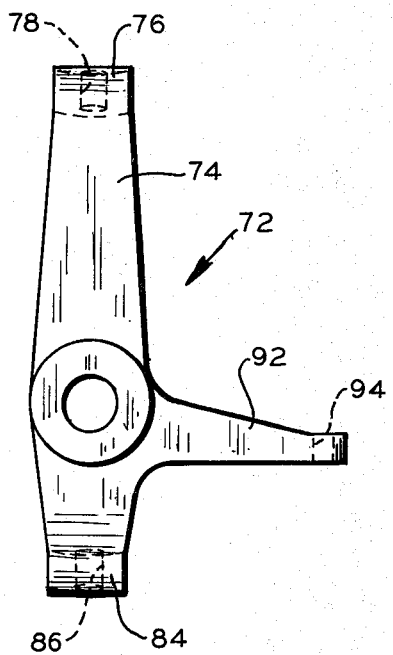
FIG. 5 is a side elevational view of the steering knuckle illustrated in FIG. 4.
Figure 6:
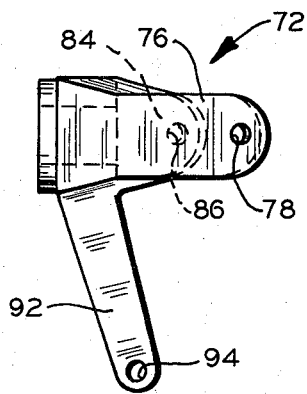
FIG. 6 is a top plan view of the steering knuckle illustrated in FIGS. 4 and 5.

Another drive axle 100 for driving the opposite front wheel from that described above has its innermost end drivingly interconnected with the differential 36 by a splined drive coupling 102 which will transmit rotational torque to the axle 100 permitting the same to slide, rotate, and pivot relative to the differential 36. The outermost end of the drive axle 100 is connected to a universal coupling 104 which, in turn, is connected to a vehicle wheel hub 106. The wheel hub 106 is journalled within a bushing in a steering knuckle 108 similar to the steering knuckle 72, above described. The steering knuckle 72 and 108 are employed for controlling the two front wheels of an associated vehicle and, therefore, must be symmetrically opposite of one another. Accordingly, it is considered necessary to illustrate only a single one of the steering knuckles in detail as in FIGS. 4, 5, and 6.

The steering knuckle 108 is formed to include a generally vertically extending main body portion 110 having an upper end 112 which terminates in a substantially transverse inwardly extending portion containing an aperture 114 for receiving a tapered shank portion of a ball-like member 116 of a conventional ball-joint connection, the socket portion 118 of which is typically press fitted to the outermost end of the upper control arm 48. The lower end 120 of the main body portion 110 of the steering knuckle 108, terminates in an inwardly extending portion containing an aperture 122 for receiving a tapered shank portion of a ball-like member 124 of a conventional ball-joint connection, the socket portion 126 of which is typically press fitted to the undersurface of the outermost end of the axle arm 32.

The steering knuckle 108 includes a steering arm 128 which extends forwardly from the main body portion 110 and contains an aperture 130 for pivotal interconnection with the steering linkage illustrated generally in phantom lines in FIG. 2. The steering system illustrated in FIG. 2 is a Haltenberger type wherein the right-hand linkage which pivotally interconnects the steering gear pitman arm to the steering arm 92 of the steering knuckle 72 also includes an intermediate inboard mounting of the left hand linkage to the steering arm 128 of the steering knuckle 108. Typically, such systems are employed because they are less expensive than other types and exhibit the desired steering requirements. It will be understood, other types of steering systems may be successfully employed with the suspension system, such as the parallelogram type which has the pitman arm on the left-hand side of the vehicle center line and an idler arm on the right hand side of the vehicle center line attached to the frame member, and a center bar conecting member.

A radius arm 132 is typically employed by having its forward end coupled to the undersurface of the axle arm 32 and the rear end coupled to the side frame member 12 by an adjustable mounting bracket 134.

Since the differential housing 36 is affixed to the axle arm 32, no bearing loads are imposed thereon. Manifestly, this feature makes possible the fabrication of a differential of light weight materials such as aluminum, for example. Also, it must be understood that the cross member 16, the spring and shock absorber towers 40 and 50, and the axle arms 28 and 32 may be formed by a stamping operation thereby maintaining the overall weight of these components at a minimum.

Further, it must be appreciated that the above described independent suspension system may be easily adjusted unlike known independent suspension systems. The caster can be adjusted by merely moving the radius arms 96 and 132 for or aft relative to the respective mounting brackets. The camber can be adjusted by either utilizing shims in the pivotal connection between the upper control arms 38 and 48 and their associated stanchions 24 and 26, respectively; or similarly adjusting the position of the pivot points for the axle arms 28 and 32 at the mounting brackets 30 and 34, respectively.

In accordance with the provisions of the Patent Statutes, I have explained the principle and mode of operation of my invention, and have illustrated and described what I now consider to represent the best embodiment. However, I desire to have it understood that within the scope of the appended claims, the invention may be practiced otherwise than as specifically illustrated and described.

What I claim is:

1. An independent wheel suspension system for a vehicle comprising:
   a frame;
   an elongate cross member secured to said frame;
   a pair of upper control arms pivotally secured to said cross member and extending in opposite directions outwardly therefrom; ;p1 a pair of axle arms pivotally secured to said cross member on the same side of the vehicle center line and substantially inwardly of the pivotal securement of the respective upper control arm and extending in opposite directions outwardly therefrom below said control arms;
   a pair of vertically extending wheel carrying steering knuckles;
   a first set of ball-joint connection means interconnecting the outer end of said control arms to the upper end of a respective one of said steering knuckles; and
   a second set of ball-joint connection means interconnecting the outer end of said axle arms to the lower end of a respective one of said steering knuckles.

2. The invention defined in claim 1 including a drive axle means drivingly connected to the wheels carried by said steering knuckles.

3. The invention defined in claim 2 including a differential drivingly connected to said drive axle means.

4. The invention defined in claim 3 wherein said differential is secured to one of said axle arms.

5. The invention defined in claim 4 wherein said drive axle means have one of their ends slidingly splined to said differential and the opposite ends universally drivingly coupled to the wheels carried by respective ones of said steering knuckles.

6. The invention defined in claim 5 including upstanding spring and shock absorber containing means affixed to opposite ends of said cross member.

7. The invention defined in claim 6 including a spring and shock absorber assembly interposed between said containing means and respective ones of said axle arms wherein said spring and shock absorber assembly is operatively disposed between said cross member and respective ones of said axle arms.

* * * * *